(12) United States Patent
Hayes et al.

(10) Patent No.: US 7,008,555 B2
(45) Date of Patent: Mar. 7, 2006

(54) EPOXY RESIN CURING AGENTS AND EPOXY RESIN COMPOSITIONS

(75) Inventors: Brian S. Hayes, Ludington, MI (US); Richard Moulton, Lafayette, CA (US); Doyle Dixon, Martinez, CA (US); Leonid Vorobyev, Walnut Creek, CA (US)

(73) Assignee: Applied Poleramic Inc., Benicia, CA (US)

( * ) Notice: Subject to any disclaimer, the term of this patent is extended or adjusted under 35 U.S.C. 154(b) by 309 days.

(21) Appl. No.: 10/443,711

(22) Filed: May 22, 2003

(65) Prior Publication Data

US 2004/0242836 A1 Dec. 2, 2004

(51) Int. Cl.
*C07C 211/54* (2006.01)
*C08G 59/50* (2006.01)
*C09K 3/00* (2006.01)

(52) U.S. Cl. .................. 252/182.13; 525/423; 525/486; 525/526; 528/91; 528/113; 528/117; 528/120; 564/434

(58) Field of Classification Search ............ 252/182.13; 525/423, 486, 526; 528/91, 113, 117, 120; 564/434

See application file for complete search history.

(56) References Cited

U.S. PATENT DOCUMENTS

| | | | |
|---|---|---|---|
| 4,427,802 A | 1/1984 | Moulton et al. ............ 523/222 |
| 4,599,413 A | 7/1986 | Moulton et al. ............ 544/231 |
| 4,902,215 A | 2/1990 | Seemann, III ............... 425/406 |
| 5,052,906 A | 10/1991 | Seemann ..................... 425/112 |
| 6,090,985 A | * 7/2000 | MacDiarmid et al. ...... 564/434 |
| 6,239,251 B1 | * 5/2001 | Wei et al. .................... 528/422 |
| 6,410,127 B1 | 6/2002 | Kamae et al. ............ 428/297.4 |

OTHER PUBLICATIONS

CAPLUS accession No. 1990:44187 for Genies et al., "Electropolymerization reaction mechanism of para–aminodiphenylamine," Journal of Electroanalytical Chemistry and Interfacial Electrochemistry (1989), vol. 269, No. 1, abstract only.*

CAPLUS accession No. 2000:594189 for Wang et al., "Stabilization and anti–corrosion property of phenyl–capped and aniline tetramer as additives to common coating," Polymer Preprints (2000), vol. 41, No. 2, abstract only.*

Derwent accession No. 2000–413230 for Chinese Patent No. 1,250792, Gao et al., Apr. 19, 2000, abstract only.*

Chemical abstracts registry No. 80471–61–0 for N–phenyl–p–phenylenediamine(4–aminodiphenylamine), 1990.*

* cited by examiner

Primary Examiner—Robert Sellers
(74) Attorney, Agent, or Firm—Dinsmore & Shohl LLP

(57) ABSTRACT

A curing agent for epoxy agent having N-phenyl-p-phenylenediamine(4-aminodiphenylamine). An epoxy resin combination having a main agent and a curing agent. The main agent has an epoxy resin. The curing agent has a N-phenyl-p-phenylenediamine(4-aminodiphenylamine).

8 Claims, No Drawings

EPOXY RESIN CURING AGENTS AND EPOXY RESIN COMPOSITIONS

BACKGROUND OF THE INVENTION

1. Field of the Invention

The invention is related to curing agents for epoxy resin systems that provide excellent mechanical properties and impart toughness to the cured resin system. The aromatic amine curing agents according to the invention have utility in commercial aircraft, aerospace structures, or other applications requiring high performance epoxy resins. This aromatic amine, used alone or in combination with other amines, curing agents, or compatible modifiers, may be useful as a curing agent for epoxy resins for resin transfer molding (RTM) resins, vacuum assisted resin transfer molding (VARTM) resins, pultrusion resins, film adhesives, prepreg resins, and other composite manufacturing type applications.

2. Description of the Related Art

Fiber reinforced polymeric matrix composites are being used and targeted for many structural applications in areas such as aircraft, aerospace, automotive, and sporting goods. Typically, these high performance composites contain orientated continuous carbon fibers, woven fabric or unidirectional, cured in a thermoset matrix. Glass or Kevlar® fibers may also be used in these applications. While there are many types of thermoset matrices that find use in composite applications, epoxy resins dominate the market due to ease of use, excellent properties, and relatively low cost.

Epoxy resins are compounds that contain an oxygen atom connected to two adjacent carbon atoms. A variety of epoxy resins are known and commercially available.

Epoxy resins of the type of diglycidyl ethers of bisphenol A are most easily available under trade names of Epon 828, Epon 1001, Epon 1002, Epon 1004, Epon 1007 from Shell Chemical Co. Their chemical structure corresponds to the formula:

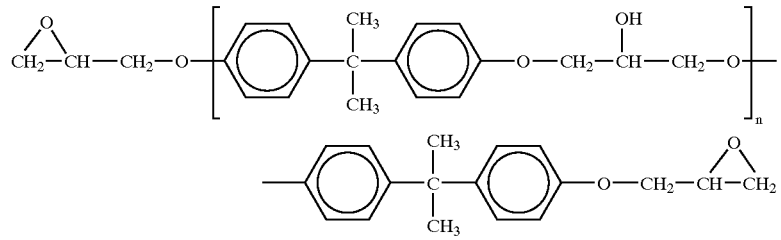

wherein n is the degree of the polymerization.

Novolac type epoxy resins are obtained by reacting novolacs, which are reaction products of phenol and formaldehyde, with epichlorohydrin and correspond to the general formula:

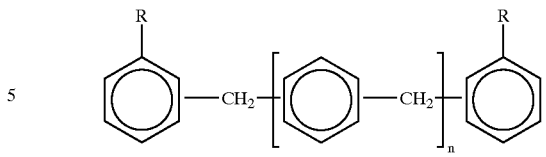

wherein R is

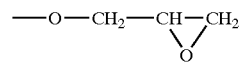

and n is the degree of polymerization. Cresol may be substituted in place of phenol to form corresponding novolacs.

Another epoxy resin that is extensively used in the aerospace industry in primary and secondary structures is tetraglycidyl methylene dianiline (TGMDA). TGMDA has the following chemical structure:

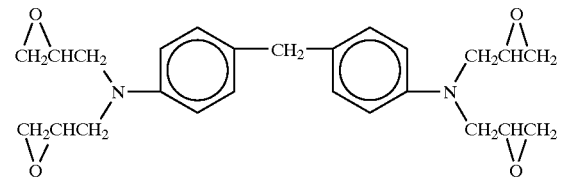

Thermoset matrix prepregs are the most widely used materials for manufacturing high performance composites. These pre-engineered laminating materials have a discrete resin/fiber ratio that require further lay-up of the continuous fiber plies to produce the final composite. The prepreg layup is then usually placed in an autoclave or press and cured under elevated temperature and pressure. While prepreg materials may be the most common method for producing advanced composites at present, lower cost manufacturing methods, such as resin transfer molding (RTM) and vacuum assisted resin transfer molding (VARTM) are being readily adopted for replacing this older technology. These methods for developing high performance composites consist of infusing a liquid resin system into a dry fabric reinforcement or preform of fibers, followed by curing at appropriate temperature and pressure. Different from prepreg resins, RTM or VARTM resins must be low viscosity during infusion, having an adequate out-time, and be homogeneous before cure. This limits the use of some typical prepreg curing agents and some resins since they may impart high viscosity or can be solids in particulate form. In addition, conventional toughness modifiers, such as thermoplastics and elastomers, are very limited to usage in these systems since they increase viscosity to an unacceptable level.

One method of making composite materials is by resin transfer molding (RTM). This is a process by which a resin system is transferred while at relatively low viscosity and under pressure into a closed mold with all of the important reinforcements and inserts already in place. The resin system can be prepared by premixing and placing the resin system into a resin injection pot or by metering components from separate pots at the appropriate mix ratio to an in-line static mixer or mixing zone. The resin system is then injected into the mold which is maintained under low pressure or under vacuum. The mold is often filled with resin while under vacuum to eliminate air from the mold space, to assist in resin injection and to aid in the removal of volatiles. The viscosity of the resin system dictates whether pot and/or mold heat is required. Low resin viscosity at the injection temperature is desirable to obtain best mold filling and mold wetting. After the mold is filled, it is sealed and heated in accordance with the appropriate cure schedule. The resulting molded part can then be removed from the mold and post-cured as necessary.

In order to achieve good fiber impregnation and low void content during RTM processing, resin viscosity below about 2000 cps at the injection temperature is highly desired, with resin viscosity below 1000 cps being preferred, and below 100 cps, most preferred. Further, the resin system must maintain this low viscosity for a period of time sufficient to completely fill the mold and impregnate the fiber preform. For RTM processing, such time is frequently measured in terms of the pot life of the resin, which can be defined as the time required for the resin to double its viscosity value. A resin pot life of at least 1 hour, and preferably two hours or more, is generally required for production of parts via RTM.

Vacuum assisted resin transfer molding (VARTM) is a composite manufacturing method by which the resin is impregnated into the continuous fibers or fabric through an atmospheric pressure differential between the resin environment and the composite fibrous reinforcement environment. Usually, the fiber reinforcement is placed under an air impermeable bag, made of Nylon film or silicone sheeting that is on top of aluminum or steel plate or "tool". Air is usually evacuated from space between this flexible bag and tool using a vacuum pump at one end of the part to be made. Opposite this end, a resin distribution line is usually connected to a valve that can be opened and allows the resin to be pushed by the atmosphere into the evacuated bag throughout the fibrous reinforcement. Usually, a resin distribution medium, or a more porous medium than the fibers is placed on top of the fibrous reinforcement for faster impregnation. Many different types of VARTM manufacturing methods exist and methods for resins distribution are described further in U.S. Pat. Nos. 4,902,215 and 5,052,906, which are hereby incorporated by way of reference in their entirety.

Modified or unmodified resin systems can be used in conjunction with woven fabric or non-woven mat reinforcements or preforms to directly produce advanced composite parts via processes such as RTM, RFI, VARTM. In these processes, the resin and fiber are combined during the actual part molding process. Any of the fiber types known to one skilled in the art may be utilized, with the most preferred type being determined by the performance characteristics of the application.

Epoxy based resin systems used for RTM and VARTM applications may consist of either one or two component systems. Single component resin systems do commercially exist, but usually require cold storage similar to prepreg materials since they contain the curing agent and or catalysts in the resin. A RTM resin manufactured for advanced composites that is representative of this type of technology is RTM 6, by Hexcel. Two part resin systems differ in that the epoxy resin and curing agent or catalyst, are stored in separate containers and therefore can be stored at ambient temperature without advancing the resin or promoting reaction. Once both parts are mixed, the composition can be used for infusion, similar to that of a single component resin system.

Resin systems containing an epoxide resin and aromatic amine hardener are often used in advanced composites since they possess a balance of properties generally required for such high performance applications. An example of a resin systems that has been used extensively in aerospace primary and secondary structures is based on tetraglycidyl-methylenedianiline [TGMDA] epoxy resin and 4,4'-diaminodiphenylsulfone [4,4'-DDS] curing agent. Fiber reinforced composites based on this resin system have excellent compression properties and high thermal performance. One drawback, from a mechanical property standpoint, of this type of composite system is its inherent brittle nature. As such, thermoplastic and rubber materials have been added for increasing toughness of such systems. While this type of resin system makes excellent prepreg materials, problems arise when using DDS for liquid molding systems. In its unmodified form, DDS is a powder that requires melting or pre-adducting into the epoxy resin before curing so that the two components are homogeneous and single phase. This generally results in a very high mixed viscosity, and renders these formulations only useful for manufacturing techniques such as resin film infusion. An example of this technology is 3501-6 or 3501-RC manufactured by Hexcel, which has been used for resin film infusion for decades. Complicating the use of DDS for two part resins is that it is relatively insoluble in other aromatic amine-type curing agents. Therefore, the use of this curing agent for two part, epoxy/aromatic amine cured systems is limited to a small percent.

Presently, the most widely used two component RTM and VARTM resin system is one manufactured by Resolution Performance Products, consisting of Epon 862 and curing agent W, a diglycidyl ether of bisphenol F epoxy and an liquid aromatic amine diethylene toluene diamine (DETDA), respectively. Unique to this composition is the liquid aromatic amine curing agent, which is semi-latent and provides moderate thermal properties. This system, although excellent for processing, suffers from a low balance of mechanical properties, not approaching high performance matrix resins used for aerospace grade prepreg systems. The desire to manufacture high performance two part VARTM and RTM resins has driven research and development to provide higher performing matrix resins coupled with desired low cost processing. At present, only a few commercial liquid aromatic amine curing agents exist, which are typically based on DETDA. This product, although low in viscosity, has not provided the necessary mechanical properties for use as a matrix in high performance composites. Liquid mixtures of aromatic amines have previously been made and sold in production quantities. The most common is known as Tonox 60/40 which consists of 60 percent m-phenylenediamine and 40 percent methylenedianiline, manufactured by Uniroyal. This combination and all previous known liquid aromatic amines do not pass the required combination of long infusion and processing time, high mechanical properties, adequate toughness, and non-carcinogenicity.

Presently, no individual amine structure or combination or blend satisfies the combination of low viscosity processing, low temperature gelation/vitrification and high mechanical properties required for structural aircraft composites.

SUMMARY OF THE INVENTION

The present invention describes the utilization of a new aromatic amine compound for curing epoxy resin systems that can be used in matrices in advanced composites and provide the necessary balance of processing and mechanical properties. Unique to the aromatic amine of this invention is that it aids in making liquid amine blends when combined with other aromatic amines. To further increase the stability of liquid blends containing this aromatic amine, adducts can be made with the aromatic amines with other compounds. This aromatic amine when used alone or in combination with other amines or compounds and used to cure epoxy resins, provide excellent mechanical properties, unlike the current commercial aromatic amine cured systems associated with prior art resin systems. This aromatic amine is most useful as a part of the curing agent for two part epoxy/amine RTM and VARTM resins for commercial aircraft applications, aerospace applications, and those related to transportation and sporting goods.

One embodiment of the present invention is a curing agent for epoxy resins. The curing agent comprises N-phenyl-p-phenylenediamine(4-aminodiphenylamine).

Another embodiment of the present invention is an epoxy resin combination. The epoxy resin combination comprises a main agent and a curing agent. The main agent comprises an epoxy resin and the curing agent comprises N-phenyl-p-phenylenediamine(4-aminodiphenylamine).

While the specification concludes with claims particularly pointing out and distinctly claiming the present invention, it is believed the same will be better understood from the following description.

DETAILED DESCRIPTION

The present invention relates to epoxy resin combinations and a curing agent for epoxy resin systems comprising N-phenyl-p-phenylenediamine(4-aminodiphenylamine). N-phenyl-p-phenylenediamine (4-aminodiphenylamine) is an aromatic amine.

This solid aromatic amine, when heated and melted to a liquid state, can be combined in a high percentage with other solid or liquid aromatic amines or curing agents and remains a stable liquid at ambient or lower temperature. Unique to this solid aromatic amine is that when it is combined with other solid aromatic amines and melted, it increases the stability of the blend in liquid form by reducing crystallization. Also, the resulting liquid has relatively low viscosity when compared with ones made using most other solid aromatic amines as the major constituent. Furthermore, the use of this aromatic amine imparts toughness to the cured resin system while maintaining other critical design properties such as compression and shear modulus and strength. Stability of this liquid is a function of the percentage of the aromatic amine of the present invention, as well as the percentage of the other aromatic amines in the blend.

Other materials such as reactive/non reactive diluents, thermoplastics, elastomers, chain extenders, reactive modifiers, catalysts, antioxidants, and the like all of which are known in the art, can also be added or reacted to this aromatic amine or its mixtures with other amines to make a more stable liquid.

The aromatic amine curing agents of the present invention can be used to cure any epoxy type resin which may contain various reactive/non reactive diluents, thermoplastics, elastomers, chain extenders, catalysts, antioxidants, and the like all of which are known in the art.

Curing agents for epoxy resins are compounds that have a reactive moiety that can react with the epoxy group of an epoxy resin. Depending on the curing agent, heat may be required for significant reaction to occur. Curing agents for epoxy resins include, but are not limited to aromatic amines, cyclic amines, aliphatic amines, alkyl amines, various acid anhydrides, carboxylic anhydrides, carboxylic acid amides, carboxylic acid hydrazides, polyamides, polyphenols, cresol and phenol novolac resins, isomers of dicyandiamide, substituted ureas, imidazoles, tertiary amines, Lewis acid complexes such as boron trifluoride and boron trichloride, polymercaptans, or any epoxy-modified amine products thereof, Mannich modified products thereof, and Michael modified addition products thereof. In one embodiment of the present invention, all of these mentioned curing agents may be combined with the aforementioned amines of this invention, either alone or in any combination for the present invention.

Exemplary aromatic amines for addition to the curing agent of the present invention include, but are not limited to 1,8 diaminonaphthalene, m-phenylenediamine, diethylene toluene diamine, diaminodiphenylsulfone, diaminodiphenylmethane, diaminodiethyldimethyl diphenylmethane, 4,4'-methylenebis(2,6-diethylaniline), 4,4'-methylenebis(2-isopropyl-6-methylaniline), 4,4'-methylenebis(2,6-diisopropylaniline), 4,4'-[1,4-phenylenebis(1-methyl-ethylindene)]bisaniline, 4,4'-[1,3-phenylenebis(1-methyl-ethylindene)]bisaniline, 1,3-bis(3-aminophenoxy)benzene, bis-[4-(3-aminophenoxy)phenyl] sulfone, bis-[4-(4-aminophenoxy)phenyl]sulfone, 2,2'-bis [4-(4-aminophenoxy)phenyl]propane. Furthermore, the aromatic amines for addition to the curing agent of the present invention may include heterocyclic multifunctional amine adducts as disclosed in U.S. Pat. Nos. 4,427,802 and 4,599,413, which are hereby both incorporated by way of reference in their entirety.

In one embodiment, the curing agent of the present invention further comprises a heterocyclic compound having the formula:

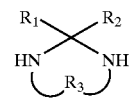

wherein $R_1$ and $R_2$ are each independently selected from the group consisting of hydrogen, alkyl, phenyl,

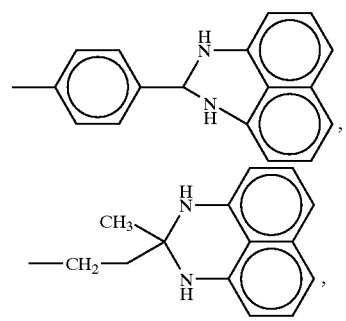

-continued

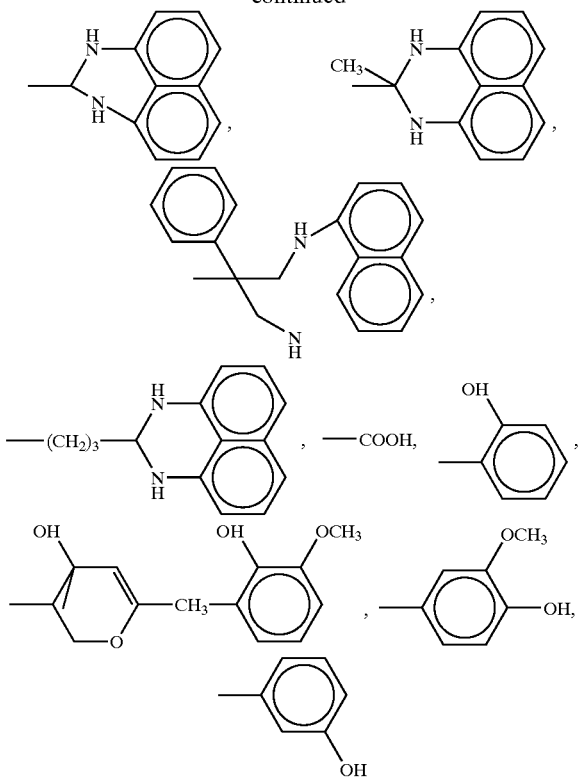

and $R_1$ and $R_2$ may jointly form

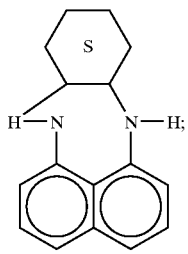

and $R_3$ is selected from the group consisting of

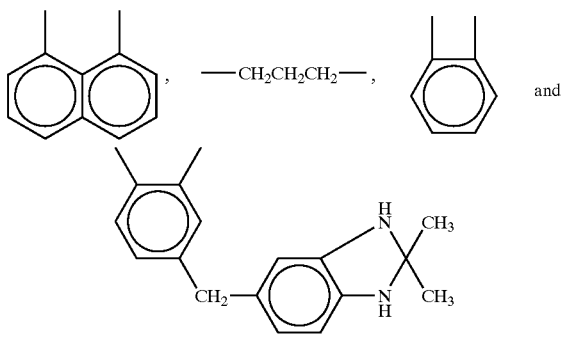

Any of the above aromatic amines can be used either individually or in various combinations in the curing agent of the present invention.

In another embodiment of the present invention, the curing agent further comprises cyclic amines. Examples of cyclic amines include, but are not limited to bis(4-amino-3-methyldicyclohexyl)methane, diaminodicyclohexylmethane, bis(aminomethyl)cyclohexane, N-aminoethylpyrazine, 3,9-bis(3-aminopropyl)-2,4,8,10-tetraoxaspiro(5,5)undecane, m-xylenediamine, menthenediamine, isophoronediamine, 1,4-bis(2-amino-2-methylpropyl) piperazine, N,N'-dimethylpiperazine, pyridine, picoline, 1,8-diazabicyclo[5,4,0]-7-undecene, benzylmethylamine, 2-(dimethylaminomethyl)-phenol, 2-methylimidazole, 2-phenylimidazole, and 2-ethyl-4-methylimidazole. Any of the above cyclic amines can be used either individually or in various combinations in the curing agent of the present invention.

In another embodiment of the present invention, the curing agent further comprises one or more linear aliphatic amines. Exemplary linear aliphatic amines of this type include, but are not limited to diethylenetriamine, triethylenetetramine, tetraethylenepentamine, 3-(dimethylamino)propylamine, 3-(diethylamino)-propylamine, 3-(methylamino)propylamine, tris(2-aminoethyl)amine; 3-(2-ethylhexyloxy)propylamine, 3-ethoxypropylamine, 3-methoxypropylamine, 3-(dibutylamino)propylamine, and tetramethyl-ethylenediamine; ethylenediamine; 3,3'-iminobis (propylamine), N-methyl-3,3'-iminobis(propylamine); allylamine, diallylamine, triallylamine, polyoxypropylenediamine, and polyoxypropylenetriamine. Any of the above linear aliphatic amines can be used either individually or in various combinations in the curing agent of the present invention.

In yet another embodiment of the present invention, the curing agent further comprises one or more alkylamines. Exemplary alkylamines include, but are not limited to methylamine, ethylamine, propylamine, isopropylamine, butylamine, sec-butylamine, t-butylamine, n-octylamine, and 2-ethylhexylamine; dimethylamine, diethylamine, dipropylamine, diisopropylamine, dibutylamine, di-sec-butylamine, di-t-butylamine, di-n-octylamine, and di-2-ethylhexylamine; trimethylamine, tripropylamine, triisopropylamine, tributylamine, tri-sec-butylamine, tri-t-butylamine, and tri-n-octylamine.

In a further embodiment of the present invention, the curing agent further comprises one or more salts of amine compounds. Examples of salts of these amine compounds are thiocyanate, borate, hydrochloride, phosphate, and sulfate. Among them, preferred specific examples of thiocyanates are diethylenetriamine thiocyanate, 2,4,6-tris (dimethylaminomethyl)phenol thiocyanate, 1,8-diazabicyclo[5.4.0]-7-undecene thiocyanate, m-xylenediamine thiocyanate, and isophoronediamine thiocyanate.

In another embodiment of the present invention, the curing agent comprises an aliphatic aromatic amine. Examples of aliphatic aromatic amines are .alpha.-(m/p-aminophenyl) ethylamine and the like.

In one embodiment of the present invention, the curing agent further comprises one or more anhydrides. Small amounts of anhydrides added to the curing agent of the present invention may provide increased stability to the curing agent composition of the present invention. Examples of such anhydrides include, but are not limited to, phthalic anhydride, hexahydrophthalic anhydride, nadic methyl anhydride, dodecenylsuccinic anhydride, tetrahydrophthalic anhydride, maleic anhydride, pyromellitic dianhydride, trimellitic anhydride, benzophenonetetracarboxylic dianhydride, and any derivative or adduct thereof.

To increase the stability of the liquid amine curing agent of the present invention, epoxy resins or other compounds may be reacted or added with the amines and other curing agents while mixing at ambient or elevated temperature. In one embodiment, the epoxy resins may be reacted only to one amine or curing agent or the epoxy may be added to the liquid mixture and allowed to react in-situ. The percentage of these epoxies used are typically very small but may be up to 50% by weight or higher. The preferred epoxy resins useful in this invention are monofunctional epoxies, since they usually have low viscosity, provide low molecular weight adducts, and only react with one active hydrogen on the amine curing agent. Examples of monofunctional epoxy resins include aliphatic, cycloaliphatic, and aromatic monofunctional epoxy resins and include such chemistries as cresyl glycidyl ether, benzyl glycidyl ether. However, many other epoxy resins may be pre-reacted with the aromatic amine of this invention, or other curing agents combined with this aromatic amine, and include, but are not limited, to difunctional, trifunctional, tetrafunctional, and higher functional epoxy resins. Examples of these types of epoxies include, but are not limited to diglycidyl ethers of bisphenol A, diglycidyl ethers of bisphenol F, diglycidyl ether of bisphenol S, diglycidyl-p-aminophenol, triglycidyl aminocresol, triglycidyl-p-aminophenol, tetraglycidyl ethers of methylenedianiline, phenol novolac type epoxy resins, cresol novolac type epoxy resins, resorcinol type epoxy resins, epoxy resins with a naphthalene skeleton, biphenyl type epoxy resins, dicyclopentadiene type epoxy resins and diphenylfluorene type epoxy resins, etc. These resins can be used individually or in any appropriate combinations.

To further promote increased stability of the curing agents of the present invention, functionalized or nonfunctional thermoplastics or elastomers may be incorporated into the liquid or pre-reacted with the liquid amine mixture. Due in general to the high molecular weight of these materials, only small quantities may be used but may include up to 50 wt % or higher. Examples of such thermoplastic materials include polyethersulfone, polysulfone, polyetherimide, polyamides, polycarbonates, to name a few. Examples of such elastomers may include butadiene acrylonitrile rubber that is non functional or has terminal or pendant functionality of epoxy, amines, carboxyl, hydroxyl, and others.

The curing agents of the present invention can be used to cure epoxy resins used for matrices for advanced fiber reinforced composites. The preferred epoxy resins for these applications include, but are not limited to, tetrafunctional and trifunctional epoxy resins. Examples of such resins have been stated previously.

Another embodiment of the present invention is an epoxy resin combination. The epoxy resin combination comprises a main agent and a curing agent. The main agent comprises an epoxy resin and the curing agent comprises N-phenyl-p-phenylenediamine(4-aminodiphenylamine).

Composite materials made by resin transfer molding or vacuum assisted resin transfer molding according to the invention have utility in the manufacture of aircraft parts, such as wing skins, wing-to-body fairings, floor panels, flaps, radomes, or automotive parts, as bumpers and springs, and as pressure vessels, tanks or pipes. Potentially, the curing agents of the present invention can be used for any composite structure and any processing technique where two parts resin systems would be advantageous, including, without limitation, industrial, commercial or military aircraft manufacture, transportation, sporting goods manufacture, and the like.

In addition to the manufacture of composite structures produced by RTM and VARTM, the curing-agents of the present invention may find utility in curing systems for resin film infusion (RFI), wet filament winding, and pultrusion processes where low resin viscosity and long pot life, are important.

The curing agents and epoxy resin combinations of the present invention also have utility in adhesives applications, as curing agent pastes for two part epoxy adhesives. The resin combinations may further be useful in electronics applications as encapsulation or potting materials.

The epoxy resin combinations of the present invention may find use in discontinuous fiber materials or otherwise reinforced composite materials (molding compounds) for compression, injection, transfer, and bulk or sheet molding process applications.

A wide variety of fiber reinforcements are available and can be used in accordance with this invention, including S-glass and E-glass fibers, carbon fibers, aromatic polyamide (Kevlar) fibers, silicon carbide fibers, poly (benzothiazole) and poly(benzimidazole) fibers, poly (benzooxazole) fibers, alumina, titania, quartz fibers, and the like. Selection of the fiber reinforcement type for these materials is determined by the performance requirements for the composite structure. For many spacecraft applications where high stiffness and low weight are critical, high modulus carbon or graphite type fibers are the preferred reinforcement. Examples of this type of fiber include P75, P100, P125 from Amoco, M40J, M55J, M60J from Toray, and K139c from Mitsubishi. Alternatively, discontinuous, non-woven cloth, whiskers, chopped fiber and mat-type reinforcement materials may also be utilized.

The following Examples are illustrative of the invention and are not intended to limit the scope thereof, which is defined by the appended claims.

EXAMPLES

Example 1

Neat resin plaques are made to demonstrate the difference in using the aromatic amine curing technology of the present invention when compared to a commercial liquid aromatic amine, diethylene toluene diamine(DETDA) by the Albelmarle Co. This liquid aromatic amine has an amine active hydrogen equivalent weight of approximately 44.5.

A liquid aromatic amine curing agent (labeled AA-1), was developed containing the aromatic amine of this invention, and consisted 40 wt % N-phenyl-p-phenylenediamine, 30 wt % 1,8-diaminonaphthalene, and 30 wt % m-phenylenediamine. These solid or flaked aromatic amines were combined in a glass container and placed in a circulating air oven, covered, and heated to 120 C. After melting took place, the liquid amine blend was mixed for another hour. The mixture of aromatic amines was cooled to room temperature and was a stable liquid for a period of at least one month at 21 C. This provided a low viscosity liquid aromatic amine blend for curing epoxy resins. The approximate active amine hydrogen equivalent weight was 40 for this mixture.

Each of these two liquid curing agents, a commercial liquid aromatic amine (DETDA) and an aromatic amine combination of the present invention (AA-1), were combined in stoichiometric amounts with Araldite™ MY 0510, triglycidyl-p-aminophenol, from Vantico, which has an epoxide equivalent weight of 105. Each composition was mixed for 5 minutes before being poured in two cavities measuring 0.5 inch by 2 inch by 4 inch of a Teflon mold, having steel face plates. This mold was preheated to 50 C before the resin systems were poured into separate compartments of the mold. Then mold was placed in an oven, temperature was ramped 2 C/min to 120 C and held for two hours to gel the compositions. Following this the oven was ramped at 2 C/min to 177 C and cured for two hours. The mold with castings was allowed to cool to room temperature before the cast resin plaques were removed. The plaques were then milled according to ASTM D695 for neat resin compression testing and tested accordingly. The compression strength and compression modulus were measured in accordance with ASTM D695. The results are in Table 1.

TABLE 1

|  | Cured with DETDA | Cured with AA-1 |
|---|---|---|
| Compression Strength, MPa Room Temperature/Ambient | 163.7 | 188.6 |
| Compression Modulus, MPa Room Temperature/Ambient | 3425 | 4284 |

As can be seen from this data in Table 1, the neat resin compression strength and modulus are much higher for the resin containing the liquid aromatic amine combination of the present invention (AA-1), versus the resin cured with the commercially available liquid aromatic amine curing agent.

Example 2

The liquid aromatic amine curing agent (AA-1), shown in EXAMPLE 1 and the same epoxy resin, triglycidyl-p-aminophenol, MY 0510 from Vantico were used to VARTM manufacture a composite consisting of 3k-70 P woven fabric containing T300 carbon fibers from Amoco. After infusion, this lay up was then ramped at approximately 2 C/min to 177 C and cured for two hours. The compression ultimate, compression modulus, open hole compression ultimate, in plane shear and per ply thickness were measured. All testing was done in accordance with those testing methods described in Boeing Material Specification 8-256, from Boeing Commercial Airplane Group, The Boeing Company, Seattle, Wash. The results for this testing are listed in Table 2.

TABLE 2

| Compression Ultimate, ksi | |
|---|---|
| Room Temperature/Ambient | 91 |
| 160 F. (71 C.)/Wet (14 days in 160 F. Water) | 64 |
| Compression Modulus, msi | |
| Room Temperature/Ambient | 7.6 |
| 160 F. (71 C.)/Wet (14 days in 160 F. Water) | 7.7 |
| Open Hole Compression Ultimate, ksi | |
| Room Temperature/Ambient | 39 |
| 160 F. (71 C.)/Wet (14 days in 160 F. Water) | 33 |
| In Plane Shear Modulus, msi | 0.49 |
| Room Temperature/Ambient | |
| Per Ply Thickness, in. | 0.0088 |

As can be seen from these results, a very good balance of properties are shown for this composite system. These properties are especially outstanding in that this resin was infused at ambient temperature using VARTM processing.

Example 3

A liquid aromatic amine curing agent (labeled AA-2), was developed that contained 30 wt % N-phenyl-p-phenylenediamine, 30 wt % m-phenylenediamine, and 40 wt % diethylene toluene diamine. This combination of solid aromatic amines and liquid aromatic amine were combined in a glass container and placed in a circulating air oven, covered, and heated to 120 C. After melting took place, the liquid amine blend was mixed for another hour. The mixture of aromatic amines was cooled to room temperature and was a stable liquid for a period of at least one month at 21 C. The resulting mixture provided a low viscosity aromatic amine blend for curing epoxy resins. The approximate active amine hydrogen equivalent weight was approximately 40 for this mixture. To lower the viscosity of this liquid aromatic amine blend, 25 wt % of a cycloaliphatic amine, bis(4-amino-3-methylcyclohexyl)methane, manufactured by AirProducts and known as Ancamine 2049 was added. Since the active amine hydrogen equivalent weight for this cycloaliphatic amine is approximately 60, this changed the active amine hydrogen equivalent weight of the mixture to approximately 43.5.

This liquid aromatic amine-cycloaliphatic amine blend, was combined with an epoxy resin combination that was infused into 3k-70 P woven fabric containing T300 carbon fibers from Amoco, using a VARTM process. This lay up was then ramped at approximately 2 C/min to 177 C and cure for two hours.

The epoxy resins consisted of 60 wt % diglycidyl ether of bisphenol-A (DER 332 from Dow Chemical Co.), 30 wt % triglycidyl-p-aminophenol (MY 0510 from Vantico), 5 wt % 1,4-butanediol diglycidyl ether (Epodil 750), and 5 wt % cresylglycidyl ether (Epodil 742 from AirProducts).

All testing was done in accordance with those testing methods described in Boeing Material Specification 8-256, from Boeing Commercial Airplane Group, The Boeing Company, Seattle, Wash. The results for these tests are listed in Table 3.

TABLE 3

| Compression Ultimate, ksi | |
|---|---|
| Room Temperature/Ambient | 76 |
| 160 F. (71 C.)/Wet (14 days in 160 F. Water) | 72 |
| Compression Modulus, msi | |
| Room Temperature/Ambient | 7.4 |
| 160 F. (71 C.)/Wet (14 days in 160 F. Water) | 7.5 |
| Open Hole Compression Ultimate, ksi | |
| Room Temperature/Ambient | 35 |
| 160 F. (71 C.)/Wet (14 days in 160 F. Water) | 36 |
| In Plane Shear Modulus, msi | 0.39 |
| Room Temperature/Ambient | |
| Per Ply Thickness, in. | 0.0090 |

As seen in this table, the outstanding feature of this composite system is the small difference or change in dry mechanical test values versus hot-wet test values.

Example 4

A liquid aromatic amine curing agent (labeled AA-3), was developed and consisted of 45 wt % 1,8 diaminonaphthalene, 15 wt % N-phenyl-p-phenylenediamine, and 40 wt % of a heterocyclic multifunctional amine adducts as disclosed in the aforesaid U.S. Pat. Nos. 4,427,802 and 4,599,413. This aromatic amine adduct is shown below which is a condensation product of 1,8 diaminonaphthalene and acetone.

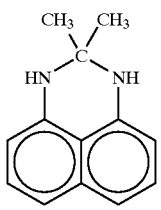

This combination of aromatic amines were combined in a glass container and placed in a circulating air oven, covered, and heated to 120 C. After melting took place, the liquid amine blend was mixed for another hour. The mixture of aromatic amines was cooled to room temperature and was a stable liquid for a period of at least one month at 21 C. To accelerate cure of the epoxy resins used in this example, 1.5 phr (parts per hundred) of boron trifluoride piperazine was incorporated with this amine combination. The amine equivalent weight of this mixture is approximately equal to 57.

This liquid aromatic amine blend, was combined with an epoxy resin combination consisting of 55 wt % tetraglycidyl ether of methylene dianiline (MY 721 from Vantico), 25 wt % triglycidyl-p-aminophenol (MY 0510 from Vantico), 15 wt % 3,4-epoxy cyclohexylmethyl-3,4-epoxycyclohexane carboxylate (ERL 4221 from Union Carbide Co.) and 5 wt % limonene dioxide (from Atofina). This resin was infused into a Saertex T700 woven stiched fiberous preform, using an RTM process. This lay up was then ramped at approximately 2C/min to 177 C and cured for two hours.

The mechanical properties of this RTM manufactured composite are listed in Table 4.

TABLE 4

| Open Hole Compression Ultimate, ksi | |
|---|---|
| Room Temperature/Ambient | 44.9 |
| 160 F. (71 C.)/Wet (14 days in 160 F. Water) | 35.5 |
| Compression Ultimate, ksi | |
| Room Temperature/Ambient | 75 |
| 160 F. (71 C.)/Wet (14 days in 160 F. Water) | 57 |
| Compression Modulus, msi | 9.09 |
| Room Temperature/Ambient | |
| Open Hole Tensile Ultimate, ksi | 75 |
| Room Temperature/Ambient | |

As can be observed in this example, the balance of mechanical properties are superior to most VARTM/RTM resins when compared to present state of the art resin compositions.

Example 5

A liquid aromatic amine curing agent (labeled AA-4), was developed according to the present invention, and consisted of 26.1 wt % N-phenyl-p-phenylenediamine, 39.0 wt % 1,8 diaminonaphthalene, 26.1 wt % of 3,4-epoxy cyclohexylmethyl-3,4-epoxycyclohexane carboxylate (ERL 4221, from Union Carbide Co.) and 8.8 wt % limonene dioxide (from Atofina). These solid or flaked aromatic amines were combined in a glass container and placed in a circulating air oven, covered, and heated to 120 C. After melting took place, the liquid amine blend was mixed for another hour. The mixture of aromatic amines was cooled to room temperature and the liquid cycloaliphatic epoxies were added to the liquid aromatic amines. This provided increased stability of the amines in liquid form, but refrigeration is required so that the amines do not react with the epoxies. The approximate active amine hydrogen equivalent weight was 72.

This liquid aromatic amine/cycloaliphatic epoxy blend, was combined with an epoxy resin combination that consisted of 49.6 wt % tetraglycidyl ether of methylene dianiline (MY 721 from Vantico), 49.6 wt % triglycidyl-p-aminophenol (MY 0510 from Vantico), and also a latent catalyst, boron trifluoride piperidine (from Atofina), in the amount of 0.7 wt %.

This resin was infused into a Saertex T700 woven stiched fiberous preform, using an RTM process. This lay up was then ramped at approximately 2C/min to 177 C and cured for two hours.

The mechanical properties of this RTM manufactured composite are listed in Table 5.

TABLE 5

| Open Hole Compression Ultimate, ksi | |
|---|---|
| Room Temperature/Ambient | 44.2 |
| 160 F. (71 C.)/Wet (14 days in 160 F. Water) | 35.1 |
| Compression Ultimate, ksi | |
| Room Temperature/Ambient | 78 |
| 160 F. (71 C.)/Wet (14 days in 160 F. Water) | 61.5 |
| Compression Modulus, msi | 9.22 |
| Room Temperature/Ambient | |
| Open Hole Tensile Ultimate, ksi | 78 |
| Room Temperature/Ambient | |

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. Accordingly, this invention is intended to embrace all alternatives, modifications and variations that have been discussed herein, and others that fall within the spirit and broad scope of the claims.

We claim:

1. A curing agent for epoxy resins comprising N-phenyl-p-phenylenediamine(4-aminodiphenylamine), further comprising one or more additional aromatic amines, an anhydride or boron trifluoride piperazine.

2. The curing agent of claim 1, further comprising one or more curing agents selected from the group consisting of: aromatic amines, cyclic amines, aliphatic amines, alkyl amines, acid anhydrides, carboxylic anhydrides, carboxylic acid amides, carboxylic acid hydrazides, polyamides, polyphenols, cresol, phenol novolac resins, isomers of dicyandiamide, substituted ureas, imidazoles, tertiary amines, boron triflouride, boron trichloride, polymercaptans, and any epoxy-modified amine products thereof, Mannich modified products thereof, and any Michael modified addition products thereof.

3. The curing agent of claim 1, wherein the one or more aromatic amines comprises one or more aromatic amines selected from the group consisting of: 1,8diaminonaphthalene; m-phenylenediamine; diethylene toluene diamine; diaminodiphenylsulfone; diaminodiphenylmethane; diaminodiethyldimethyl diphenylmethane; 4,4'-methylenebis(2,6-diethylaniline); 4,4'-methylenebis(2-isopropyl-6-methylaniline); 4,4'-methylenebis(2,6-diisopropylaniline); 4,4'-[1,4-phenylenebis(1-methylethylidene)]bisaniline; 4,4'-[1,3-phenylenebis(1-methyl-ethylindene)]bisaniline; 1,3-bis(3-aminophenoxy)benzene; bis-[4-(3-aminophenoxy)phenyl]sulfone; bis-[4-(4-aminophenoxy)phenyl]sulfone; and 2,2'-bis[4-(4-aminophenoxy)phenyl]propane.

4. The curing agent of claim 1, further comprising an anhydride.

5. The curing agent of claim 1, further comprising 1-8-diaminonaphthalene and m-phenylenediamine.

6. The curing agent of claim 1, wherein N-phenyl-p-phenylenediamine (4-aminodiphenylamine) comprises from about 20 wt % to about 80 wt % of the curing agent.

7. The epoxy curing agent of claim 1, further comprising m-phenylenediamine and diethylene toluene diamine.

8. The epoxy curing agent of claim 1, further comprising boron trifluoride piperazine.

* * * * *